US010303188B2

(12) United States Patent
Inoue

(10) Patent No.: US 10,303,188 B2
(45) Date of Patent: May 28, 2019

(54) FLOW RATE ADJUSTING DEVICE

(71) Applicant: Surpass Industry Co., Ltd., Gyoda-shi, Saitama (JP)

(72) Inventor: Atsushi Inoue, Gyoda (JP)

(73) Assignee: SURPASS INDUSTRY CO., LTD, Saitama (JP)

( * ) Notice: Subject to any disclaimer, the term of this patent is extended or adjusted under 35 U.S.C. 154(b) by 135 days.

(21) Appl. No.: 15/413,545

(22) Filed: Jan. 24, 2017

(65) Prior Publication Data
US 2017/0220051 A1 Aug. 3, 2017

(30) Foreign Application Priority Data

Feb. 3, 2016 (JP) ................................. 2016-019243

(51) Int. Cl.
*G01F 1/66* (2006.01)
*G05D 7/06* (2006.01)
*G01F 15/00* (2006.01)
*F16K 31/02* (2006.01)
*F16K 1/12* (2006.01)

(52) U.S. Cl.
CPC ............ *G05D 7/0635* (2013.01); *F16K 1/12* (2013.01); *F16K 31/02* (2013.01); *G01F 1/662* (2013.01); *G01F 1/667* (2013.01); *G01F 15/005* (2013.01)

(58) Field of Classification Search
CPC ...... G05D 7/0623; G05D 7/0635; F16K 1/12; F16K 31/02; G01F 15/005; G01F 1/662; G01F 1/667
USPC ..................................................... 137/487.5
See application file for complete search history.

(56) References Cited

U.S. PATENT DOCUMENTS

| 4,656,870 A * | 4/1987 | Ruthrof ................ G10K 11/004 310/319 |
| 7,163,024 B2 * | 1/2007 | Igawa ................. F16K 31/1268 137/486 |
| 2003/0045011 A1 * | 3/2003 | Sandhu ..................... G01F 1/40 438/14 |

(Continued)

FOREIGN PATENT DOCUMENTS

| CA | 2574616 A | 7/2006 |
| JP | 2005-274264 A | 10/2005 |

(Continued)

OTHER PUBLICATIONS

Machine translation of JP 2005-274264A.
Machine translation of JP 2012-018031A.

*Primary Examiner* — William M McCalister
(74) *Attorney, Agent, or Firm* — MH2 Technology Law Group, LLP

(57) ABSTRACT

Provided is a flow rate adjusting device includes an ultrasonic flow metering portion, a flow rate adjusting portion, and a control portion for controlling the flow rate adjusting portion. The flow rate adjusting portion includes a drive portion configured to cause a valve body portion to advance or recede along an axis line parallel to an installation surface. A straight tube-shaped measurement flow channel is disposed along an axis line parallel to the axis line. A control board is disposed along an axis line parallel to the axis lines. The flow rate adjusting portion is disposed between the ultrasonic flow metering portion and the control portion in an axis line Y direction orthogonal to the installation surface.

6 Claims, 6 Drawing Sheets

(56) References Cited

U.S. PATENT DOCUMENTS

| | | | |
|---|---|---|---|
| 2005/0288873 A1* | 12/2005 | Urdaneta | G01F 1/66 137/487.5 |
| 2007/0016333 A1 | 1/2007 | Edwards et al. | |
| 2007/0231872 A1 | 10/2007 | Butters et al. | |
| 2008/0029174 A1 | 2/2008 | Yoshino | |
| 2009/0156659 A1 | 6/2009 | Butters et al. | |
| 2009/0283155 A1* | 11/2009 | Yoshino | F16K 31/1221 137/487.5 |
| 2010/0188261 A1 | 7/2010 | Fujii et al. | |
| 2010/0193051 A1 | 8/2010 | Igarashi | |
| 2010/0308129 A1* | 12/2010 | Jorgensen | A61L 9/14 239/34 |
| 2012/0036942 A1 | 2/2012 | Hasunuma | |
| 2013/0041201 A1 | 2/2013 | Butters et al. | |

FOREIGN PATENT DOCUMENTS

| | | |
|---|---|---|
| JP | 2012-018031 A | 1/2012 |
| JP | 2012042243 A | 3/2012 |

* cited by examiner

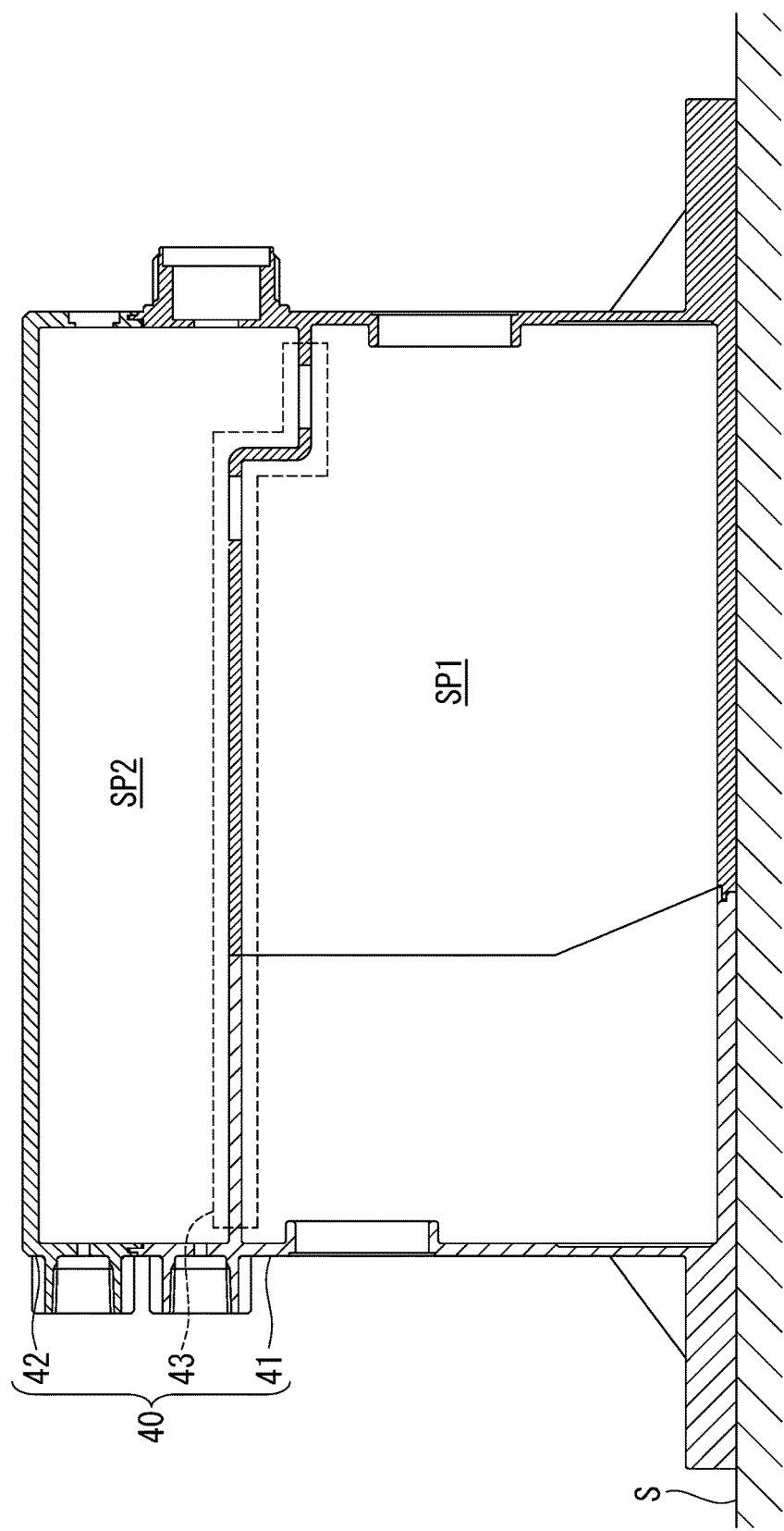

FLOW RATE ADJUSTING DEVICE

CROSS-REFERENCE TO RELATED APPLICATIONS

This application is based on Japanese Patent Application No. 2016-019243, the contents of which are incorporated herein by reference in its entirety.

TECHNICAL FIELD

The present disclosure relates to a flow rate adjusting device including an ultrasonic flow metering portion.

BACKGROUND ART

An ultrasonic flow meter including a straight tube-shaped tubular body for measurement through which a fluid for measuring a flow rate flows has been conventionally known (for example, see Japanese Unexamined Patent Application, Publication No. 2012-42243 (hereinafter referred to as "JP 2012-42243")).

The ultrasonic flow meter disclosed in JP 2012-42243 has a structure in which a pair of ultrasonic wave oscillators is disposed at a predetermined interval on the outer periphery of the straight tube-shaped tubular body for measurement.

SUMMARY

Technical Problem

However, the ultrasonic flow meter disclosed in JP 2012-42243 is exclusively used for measuring a flow rate, and does not have a function of adjusting the flow rate of a fluid. When the function of adjusting the flow rate is added to the ultrasonic flow meter disclosed in JP 2012-42243, the portion of the straight tube-shaped tubular body for measurement corresponds to a portion where ultrasonic waves transmitted from the pair of ultrasonic wave oscillators are propagated. In this portion, the flow rate adjustment cannot be performed. Accordingly, when the function of adjusting the flow rate is added to the ultrasonic flow meter disclosed in JP 2012-42243, it is necessary to connect an additional flow rate adjusting device to the downstream side of the ultrasonic flow meter. When the additional flow rate adjusting device is connected to the ultrasonic flow meter, not only an installation area for the ultrasonic flow meter, but also an installation area for the flow rate adjusting device is required, which poses a problem of an increase in the installation area (footprint) of the entire device.

The present disclosure has been made in view of the above-mentioned circumstances, and an object of the present disclosure is to provide a flow rate adjusting device capable of reducing the installation area of the entire device, while enabling a flow rate measurement by an ultrasonic flow metering portion including a straight tube-shaped measurement flow channel and adjustment of the flow rate on the basis of the measurement result.

Solution to Problem

To solve the above-mentioned problem, the present disclosure employs the following solutions.

A flow rate adjusting device according to one aspect of the present disclosure includes: an ultrasonic flow metering portion configured to measure a propagation time difference between ultrasonic waves transmitted by a pair of oscillators disposed at an upstream side and a downstream side of a straight tube-shaped measurement flow channel to obtain a flow rate of a fluid, the fluid flowing from an inflow port and being circulated through the measurement flow channel; a flow rate adjusting portion configured to adjust the flow rate of the fluid flowing out to an outflow port from the downstream side of the measurement flow channel; and a control portion configured to control the flow rate adjusting portion on the basis of the flow rate of the fluid measured by the ultrasonic flow metering portion, the control portion including at least one control board. The flow rate adjusting portion includes a valve body portion and a drive portion configured to cause the valve body portion to advance or recede along a first axis line. The measurement flow channel is disposed along a second axis line parallel to the first axis line. The control board is disposed along a third axis line parallel to each of the first axis line and the second axis line. The flow rate adjusting portion is disposed between the ultrasonic flow metering portion and the control portion in an installation direction orthogonal to an installation surface.

In the flow rate adjusting device according to one aspect of the present disclosure, a direction along a first axis line on which the valve body portion advances or recedes, a direction along a second axis line on which the straight tube-shaped measurement flow channel is disposed, and a direction along a third axis line on which the control board is disposed are each parallel to the installation surface. Accordingly, the lengths which are required by the ultrasonic flow metering portion, the flow rate adjusting portion, and the control portion, respectively, in the installation direction orthogonal to the installation surface (i.e., the heights of the ultrasonic flow metering portion, the flow rate adjusting portion, and the control portion when the installation surface is a horizontal surface) can be shortened.

Further, in the flow rate adjusting device according to one aspect of the present disclosure, since the flow rate adjusting portion is disposed between the ultrasonic flow metering portion and the control portion in the installation direction orthogonal to the installation surface, the installation area can be reduced in comparison with a case where the flow rate adjusting portion, the ultrasonic flow metering portion, and the control portion are disposed at the same position in the installation direction. This is because when the ultrasonic flow metering portion, the flow rate adjusting portion, and the control portion are stacked in the installation direction, the installation positions of these components overlap each other on the installation surface.

Thus, the flow rate adjusting device according to one aspect of the present disclosure can reduce the installation area of the entire device, while enabling a flow rate measurement by the ultrasonic flow metering portion including the straight tube-shaped measurement flow channel and adjustment of the flow rate on the basis of the measurement result.

The flow rate adjusting device according to one aspect of the present disclosure may have a structure in which the ultrasonic flow metering portion is disposed at a position closer to the installation surface in the installation direction than the control portion and the flow rate adjusting portion.

According to this structure, the ultrasonic flow metering portion is disposed at a position close to the installation surface and thus is less likely to be affected by vibrations or the like due to the operation of the flow rate adjusting portion. Therefore, the occurrence of an error in the measurement of the flow rate by the ultrasonic flow metering portion can be reduced.

The flow rate adjusting device according to one aspect of the present disclosure may further include: an inflow-side flow channel portion configured to guide the fluid flowing in from the inflow port to the upstream side of the measurement flow channel; and an outflow-side flow channel portion configured to guide the fluid to the outflow port, the fluid flowing out from the downstream side of the measurement flow channel. The inflow-side flow channel portion may include an inflow-side inclined flow channel inclined in a direction approaching the installation surface from the inflow port to the upstream side of the measurement flow channel, and the outflow-side flow channel portion may include an outflow-side inclined flow channel inclined in a direction approaching the installation surface from the flow rate adjusting portion to the outflow port.

According to this structure, due to the presence of the inflow-side inclined flow channel, the inflow port is located at a position farther from the installation surface than the measurement flow channel in the installation direction, and due to the presence of the outflow-side flow channel, the outflow port is located at a position closer to the installation surface than the flow rate adjusting portion in the installation direction. Thus, the inflow port and the outflow port can be located close to each other in the installation direction and pipes connected to the inflow port and the outflow port can be set at an equal distance from the installation surface. Consequently, the workability for attachment of pipes to the inflow port and the outflow port is improved.

The flow rate adjusting device according to one aspect of the present disclosure may further include a housing portion configured to accommodate the ultrasonic flow metering portion, the flow rate adjusting portion, and the control portion. The housing portion may include a partition member configured to partition an inside of the housing portion into a first space in which the ultrasonic flow metering portion and the flow rate adjusting portion are disposed and a second space in which the control portion is disposed.

According to this structure, even when a high-temperature fluid (for example, a liquid having a temperature in a range of 50° C. to 80° C.) is circulated, the transmission of the temperature of the first space to the second space is prevented by the partition member. Accordingly, a malfunction in the control portion due to a temperature rise, and an adverse effect on lifetime due to a temperature rise can be prevented.

The flow rate adjusting device according to one aspect of the present disclosure may further include a pressure measuring portion configured to measure a pressure of a fluid flowing into the upstream of the measurement flow channel from the inflow port.

According to this structure, the pressure (supply pressure) of the fluid flowing in from the inflow port can be appropriately detected and the supply pressure of the fluid can be stored in such a manner that, for example, a state in which the flow rate is adjusted by the flow rate adjusting portion is associated with the supply pressure of the fluid at the time. Further, an optimum flow rate adjustment can be performed according to the pressure of the fluid by, for example, adjusting the movement of the valve body portion of the flow rate adjusting portion according to the fluid pressure measured by the pressure measuring portion.

The flow rate adjusting device according to one aspect of the present disclosure may further include a shield member which is made of metal and disposed to surround the pair of oscillators.

According to this structure, since the pair of oscillators is surrounded by the shield member made of metal, the occurrence of an error in the measurement by the ultrasonic flow metering portion due to external magnetism or the like can be prevented.

Advantageous Effects

According to the present disclosure, it is possible to provide a flow rate adjusting device capable of reducing the installation area of the entire device, while enabling a flow rate measurement by the ultrasonic flow metering portion including the straight tube-shaped measurement flow channel and adjustment of the flow rate on the basis of the measurement result.

BRIEF DESCRIPTION OF DRAWINGS

FIG. 6 is a longitudinal sectional view showing a housing portion shown in FIG. 1.

DESCRIPTION OF EMBODIMENTS

A flow rate adjusting device 100 according to an embodiment of the present disclosure will be described with reference to the drawings.

Figure 1:
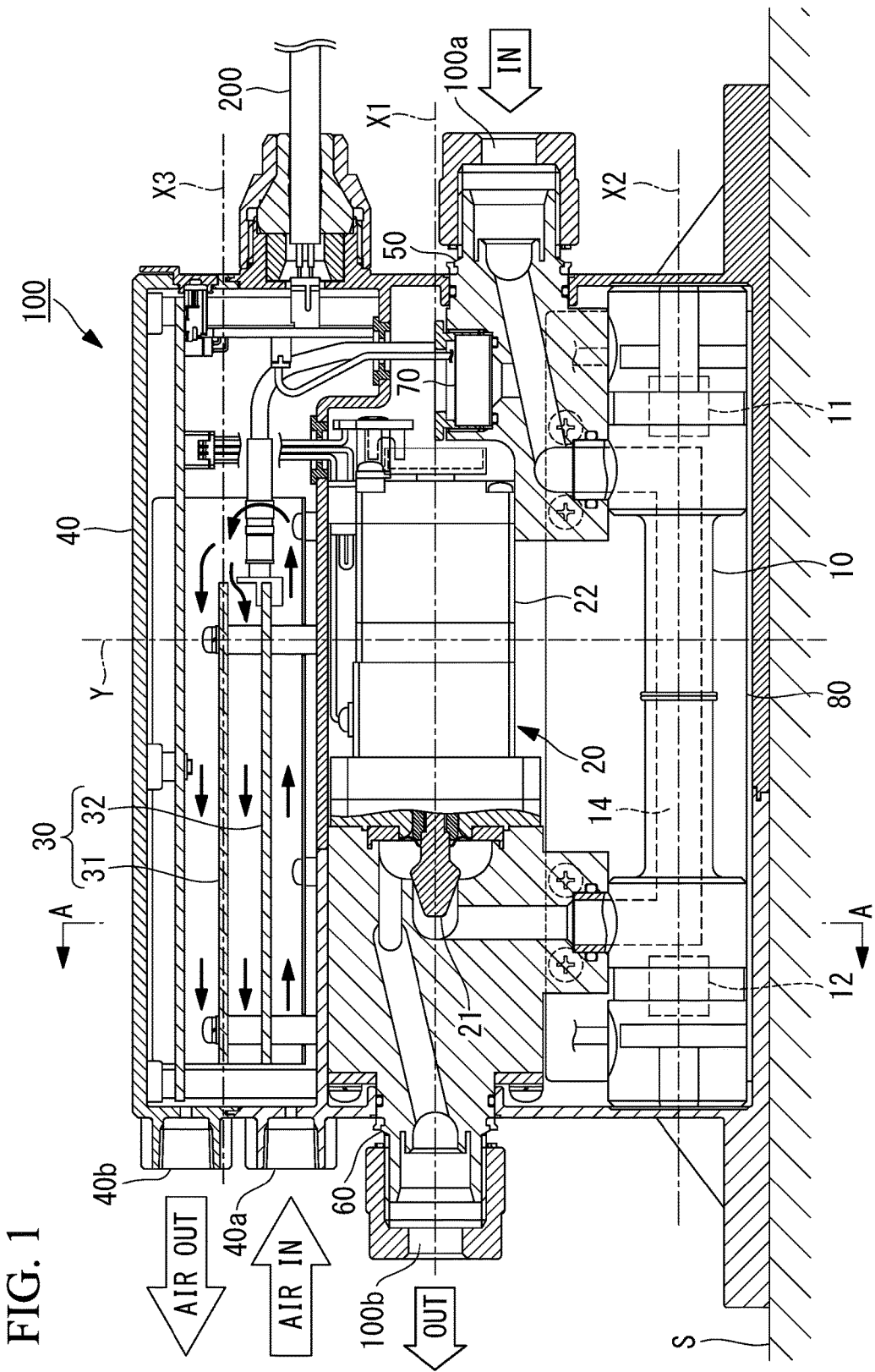
FIG. 1 is a partial longitudinal sectional view showing an embodiment of a flow rate adjusting device.
Figure 2:
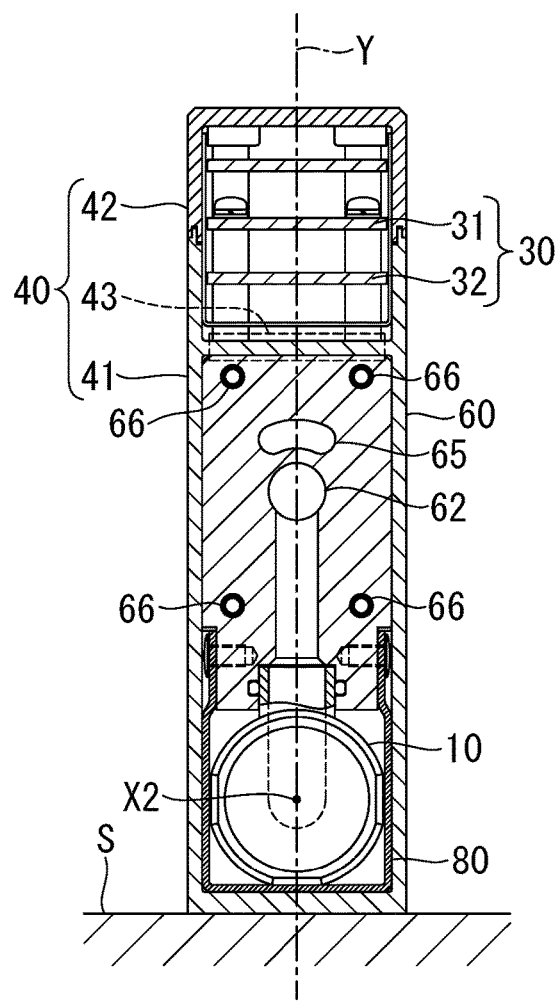
FIG. 2 is a partial sectional view taken along an arrow line A-A of the flow rate adjusting device shown in FIG. 1.

The flow rate adjusting device 100 of this embodiment shown in FIGS. 1 and 2 includes: an ultrasonic flow metering portion 10 which measures a flow rate of a fluid circulated through a straight tube-shaped measurement flow channel 14; a flow rate adjusting portion 20 which adjusts the flow rate of the fluid; a control portion 30 which controls the flow rate adjusting portion 20; a housing portion 40 which accommodates the ultrasonic flow metering portion 10, the flow rate adjusting portion 20, the control portion 30; an inflow-side flow channel portion 50 which guides the fluid flowing in from an inflow port 100a to an upstream side of the measurement flow channel 14; an outflow-side flow channel portion 60 which guides the fluid flowing out from a downstream side of the measurement flow channel 14 to an outflow port 100b; a pressure sensor (pressure measuring portion) 70; and a shield member 80.

The fluid whose flow rate is adjusted by the flow rate adjusting device 100 of this embodiment is, for example, a liquid such as a drug solution or pure water used for semiconductor manufacturing devices. The temperature of the fluid is, for example, a temperature in an ordinary temperature range (for example, 10° C. or higher and lower than 50° C.) or a high-temperature range (for example, 50° C. or higher and 80° C. or lower).

The housing portion 40 of the flow rate adjusting device 100 is fixed to an installation surface S with fastening bolts (not shown). The flow rate adjusting device 100 is connected to an external device (not shown) via a cable 200, is supplied with power from the external device via the cable 200, and transmits various signals to the external device and receives various signals therefrom. Examples of the signals received from the external device include a signal indicating a set value of a target flow rate adjusted by the flow rate adjusting device 100. Examples of the signals transmitted to the external device include a signal indicating the flow rate of the fluid calculated by the control portion 30 on the basis of s signal measured by the ultrasonic flow metering portion 10, and a signal indicating the pressure of the fluid measured by the pressure sensor 70.

The ultrasonic flow metering portion 10 measures a propagation time difference between ultrasonic waves transmitted by a pair of oscillators, i.e., an upstream side oscillator 11 disposed at the upstream side of the measurement flow channel 14 and a downstream side oscillator 12 disposed at the downstream side of the measurement flow channel 14, so as to obtain the flow rate of the fluid which flows in from an inflow-side pipe (not shown) and is circulated through the straight tube-shaped measurement flow channel 14.

Figure 3:
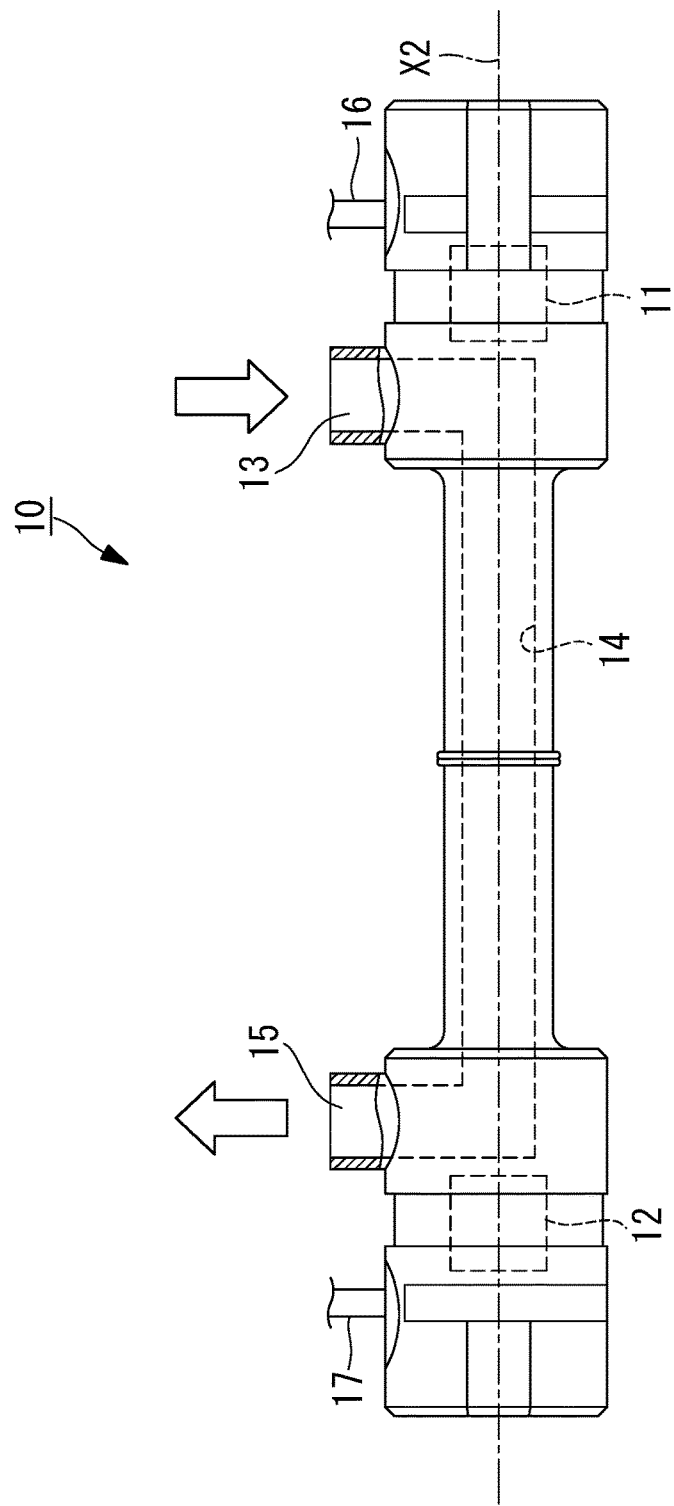
FIG. 3 is a partial longitudinal sectional view showing an ultrasonic flow metering portion shown in FIG. 1.

As shown in FIG. 3, the ultrasonic flow metering portion 10 includes: the upstream side oscillator 11 and the downstream side oscillator 12 which are disposed on an axis line X2 that is parallel to the installation surface S; an inflow channel 13 which is connected to the inflow-side flow channel portion 50; the straight tube-shaped measurement flow channel 14 which is connected to the inflow channel 13 and extends along the axis line X2 (second axis line); and an outflow channel 15 which is connected to the outflow-side flow channel portion 60. The axis line X2 is parallel to an axis line X1 (first axis line) in which a valve body portion 21, which is described later, advances or recedes.

The upstream side oscillator 11 and the downstream side oscillator 12 are disposed at positions opposed to each other across the measurement flow channel 14 on the axis line X2, and can transmit and receive ultrasonic wave signals. The ultrasonic wave signal transmitted from the upstream side oscillator 11 propagates through the fluid circulated through the measurement flow channel 14 and is received by the downstream side oscillator 12. Similarly, the ultrasonic wave signal transmitted from the downstream side oscillator 12 propagates through the fluid circulated through the measurement flow channel 14 and is received by the upstream side oscillator 11. Since the fluid is circulated through the measurement flow channel 14 from the upstream side to the downstream side, a propagation time for the ultrasonic wave signal transmitted from the upstream side oscillator 11 to the downstream side oscillator 12 is shorter than a propagation time for the ultrasonic wave signal transmitted from the downstream side oscillator 12 to the upstream side oscillator 11. The ultrasonic flow metering portion 10 measures the flow rate of the fluid circulated through the measurement flow channel 14 by using a difference between the propagation times.

Note that the transmission of the ultrasonic wave signals by the upstream side oscillator 11 and the downstream side oscillator 12 is controlled by the control portion 30 which is connected to the upstream side oscillator 11 and the downstream side oscillator 12 with signal lines 16 and 17, respectively, which are shown in FIG. 3. The ultrasonic wave signals received by the upstream side oscillator 11 and the downstream side oscillator 12 are transmitted to the control portion 30 via the signal lines 16 and 17. As described later, the control portion 30 calculates a difference between propagation times from transmission timings for the ultrasonic wave signals that are sent as instructions to the upstream side oscillator 11 and the downstream side oscillator 12 and reception timings for the ultrasonic wave signals received from the upstream side oscillator 11 and the downstream side oscillator 12 according to the transmission timings, and also calculates the flow rate of the fluid from the calculated difference between propagation times.

The flow rate adjusting portion 20 adjusts the flow rate of the fluid flowing out to the outflow port 100b which is connected to an outflow-side pipe (not shown) via the outflow-side flow channel portion 60 from the downstream side of the measurement flow channel 14. As shown in FIG. 1, the flow rate adjusting portion 20 is disposed between the ultrasonic flow metering portion 10 and the control portion 30 in an axis line Y direction corresponding to an installation direction orthogonal to the installation surface S. As shown in FIG. 1, in the axis line Y direction, the ultrasonic flow metering portion 10 is disposed at a position closest to the installation surface S, and the control portion 30 is disposed at a position farthest from the installation surface S. The flow rate adjusting portion 20 is disposed between the ultrasonic flow metering portion 10 and the control portion 30.

Figure 4:
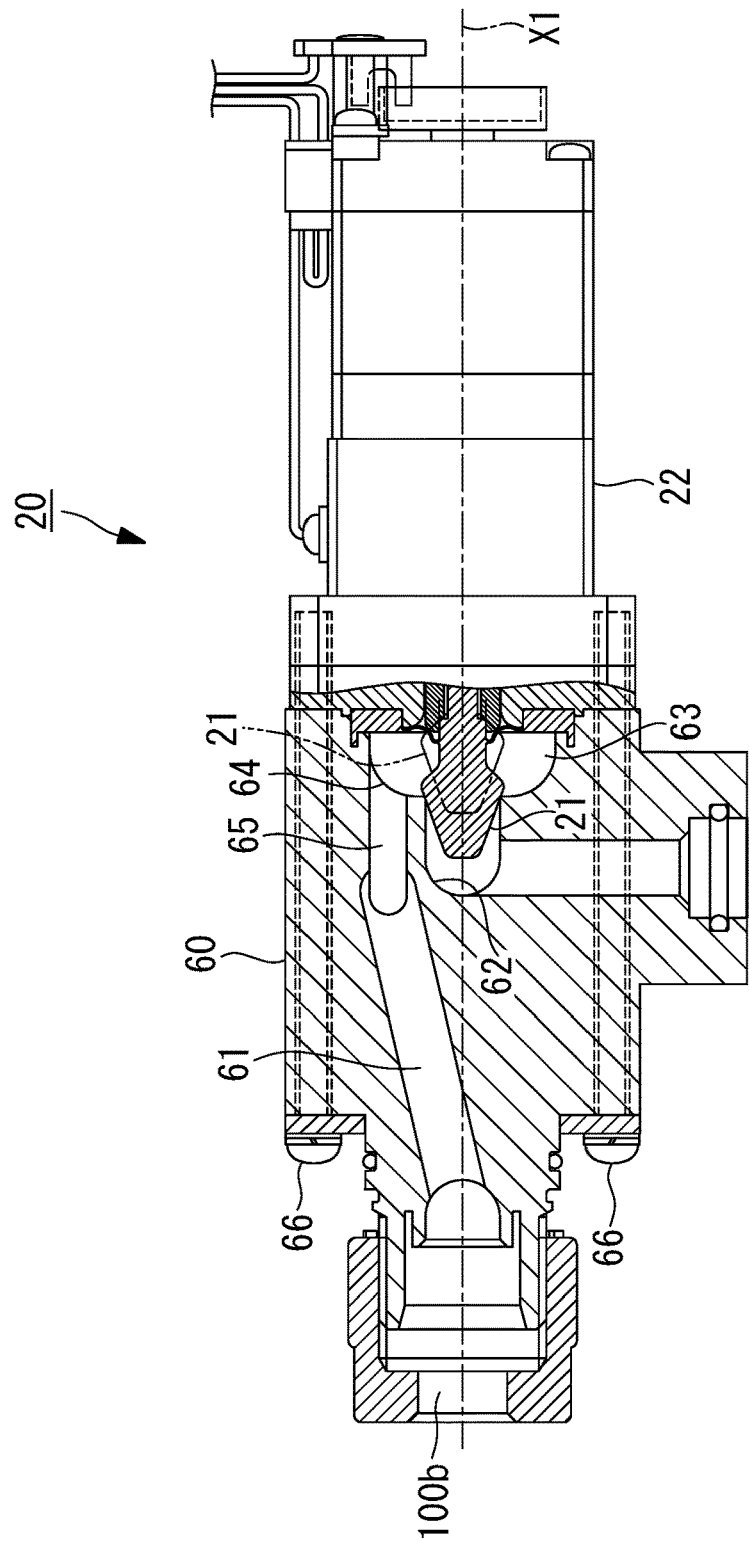
FIG. 4 is a partial longitudinal sectional view showing a flow rate adjusting portion and an outflow-side flow channel portion shown in FIG. 1.

As shown in FIG. 4, the flow rate adjusting portion 20 includes the valve body portion 21 which is inserted into a valve hole 62 that is formed in the outflow-side flow channel portion 60; and an electric driving portion 22 which causes the valve body portion 21 to advance or recede along the axis line X1 (first axis line) parallel to the installation surface S. The electric driving portion 22 causes the valve body portion 21 to advance or recede along the axis line X1 between a closed position indicated by a solid line shown in FIG. 4 and an open position indicated by a dashed line shown in FIG. 4. The flow rate adjusting portion 20 adjusts the amount of the fluid flowing into a valve chest 63 from the valve hole 62 in such a manner that the electric driving portion 22 adjusts the position of the valve body portion 21 on the axis line X1.

The control portion 30 controls the flow rate adjusting portion 20 on the basis of the flow rate of the fluid measured by the ultrasonic flow metering portion 10. The control portion 30 stores the set value of the target flow rate received from the external device via the cable 200, and controls the position of the valve body portion 21 of the flow rate adjusting portion 20 so that the flow rate of the fluid measured by the ultrasonic flow metering portion 10 matches the set value of the target flow rate.

The control portion 30 includes plate-like control boards 31 and 32 on which the above-mentioned functions are mounted. In this case, the control portion 30 includes two control boards, but instead may include at least one control board, such as one or three or more control boards. The control board 31 and the control board 32 are disposed along an axis line X3 (third axis line) parallel to the axis line X1 and the axis line X2. The positions in the axis line Y direction where the control board 31 and the control board 32 are disposed are positions farther from the installation surface S than the ultrasonic flow metering portion 10 and the flow rate adjusting portion 20.

The control portion 30 can instruct the upstream side oscillator 11 and the downstream side oscillator 12, respectively, which are included in the ultrasonic flow metering portion 10, to transmit ultrasonic wave signals. Further, the control portion 30 can detect a timing when the ultrasonic wave signal transmitted from one of the upstream side oscillator 11 and the downstream side oscillator 12 is received by the other one of the upstream side oscillator 11 and the downstream side oscillator 12.

The control portion 30 calculates a first propagation time from the transmission timing for the ultrasonic wave signal that is sent as an instruction to the downstream side oscillator 12 and the reception timing for the ultrasonic wave signal received by the upstream side oscillator 11 according to the transmission timing. Further, the control portion 30 calculates a second propagation time from the transmission timing for the ultrasonic wave signal that is sent as an instruction to the upstream side oscillator 11 and the reception timing for the ultrasonic wave signal received by the downstream side oscillator 12 according to the transmission timing. The control portion 30 obtains the flow rate of the fluid circulated through the measurement flow channel 14 on the basis of a predetermined flow rate arithmetic expression and a propagation time difference obtained by subtracting the second propagation time from the first propagation time.

As shown in FIG. 2, the housing portion 40 includes: a housing body 41 which accommodates the components of the flow rate adjusting device 100; a cap portion 42 which is attached to an upper portion of the housing body 41; and a partition member 43 which partitions an inside space formed by the housing body 41 and the cap portion 42.

As shown in FIG. 6, the partition member 43 partitions the inside of the housing portion 40 into a first space SP1 in which the ultrasonic flow metering portion 10 and the flow rate adjusting portion 20 are disposed, and a second space SP2 in which the control portion 30 is disposed. The partition member 43 isolates the second space SP2 in which the control portion 30 is disposed from the first space SP1 through which the fluid is circulated. When the fluid is at a relatively high temperature (for example, in a range of 50° C. to 80° C.), the transmission of heat of the fluid to the control portion 30 can be prevented.

As shown in FIG. 1, the housing portion 40 is provided with an air introduction port 40a and an air discharge port 40b which are formed in order from the side close to the installation surface S along the axis line Y. The air introduction port 40a is a port for guiding an air supplied from an air supply source (not shown) into the housing portion 40. The air discharge port 40b is a port for discharging the air circulated in the housing portion 40 to the outside of the housing portion 40.

As indicated by an arrow in FIG. 1, the air introduced from the air introduction port 40a is circulated toward the inflow port 100a while cooling the lower surface of the control board 32. After that, the air is circulated toward the outflow port 100b while cooling the upper surface of the control board 32 and the upper and lower surfaces of the control board 31, and is finally discharged from the air discharge port 40b.

In this manner, the control board 31 and the control board 32 can be cooled by circulating the air in the housing portion 40. Furthermore, the upper and lower surfaces of each of the control board 31 and the control board 32 can be effectively cooled by circulating the air only in the second space SP2 which is partitioned by the partition member 43.

Figure 5:
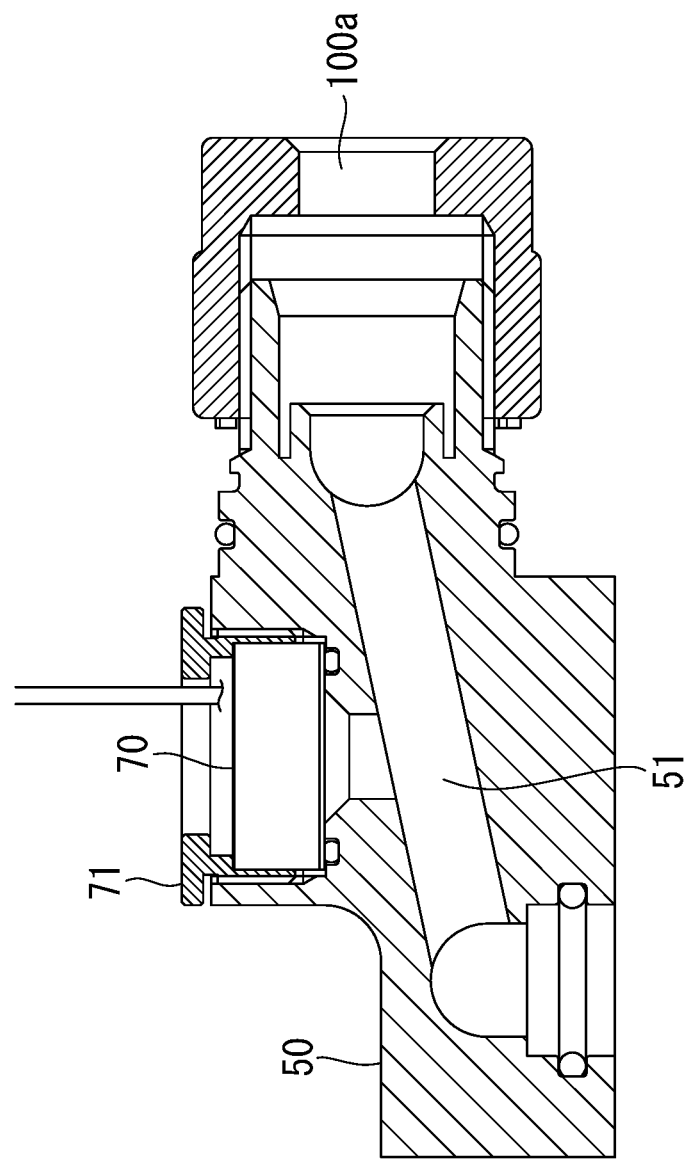
FIG. 5 is a longitudinal sectional view showing an inflow-side flow channel portion and a pressure sensor shown in FIG. 1.

As shown in FIGS. 1 and 5, the inflow-side flow channel portion 50 is a member in which an inflow-side inclined flow channel 51 that is inclined in a direction approaching the installation surface S from the inflow port 100a to the upstream side inflow channel 13 of the measurement flow channel 14 is formed inside. The inflow-side flow channel portion 50 is provided with the pressure sensor 70 for detecting the pressure of the fluid circulated through the inflow-side inclined flow channel 51.

When the installation surface S is a horizontal surface, the axis line Y direction corresponds to the vertical direction. In this case, the inflow-side flow channel portion 50 is disposed above the ultrasonic flow metering portion 10 in the vertical direction. Accordingly, even when the fluid circulated through the ultrasonic flow metering portion 10 contains air bubbles, the air bubbles are less likely to accumulate on the surface close to the upstream side oscillator 11 in the measurement flow channel 14. This is because the air bubbles are guided to the inflow-side flow channel portion 50 which is disposed above the surface close to the upstream side oscillator 11. Therefore, the occurrence of a malfunction that the flow rate is erroneously detected by the ultrasonic flow metering portion 10 due to the accumulation of air bubbles on the surface close to the upstream side oscillator 11 can be prevented.

As shown in FIGS. 1 and 4, the outflow-side flow channel portion 60 is a member in which an outflow-side inclined flow channel 61 that is inclined in a direction approaching the installation surface S from the flow rate adjusting portion 20 to the outflow port 100b is formed inside. The outflow-side flow channel portion 60 guides the fluid to the upstream side of the outflow-side inclined flow channel 61 via an outflow channel 65 from an opening 64 that is formed at an upper portion of the valve chest 63. The fluid guided to the upstream side of the outflow-side inclined flow channel 61 is further guided to the outflow port 100b along the outflow-side inclined flow channel 61.

As shown in FIGS. 2 and 4, the outflow-side flow channel portion 60 is provided with through-holes through which a plurality of fastening bolts 66 penetrate. The outflow-side flow channel portion 60 is fixed to the electric driving portion 22 by fastening the fastening bolts 66 to the electric driving portion 22.

When the installation surface S is a horizontal surface, the axis line Y direction corresponds to the vertical direction. In this case, the outflow-side flow channel portion 60 is disposed above the ultrasonic flow metering portion 10 in the vertical direction. Accordingly, even when the fluid circulated through the ultrasonic flow metering portion 10 contains air bubbles, the air bubbles are less likely to accumulate on the surface close to the downstream side oscillator 12 in the measurement flow channel 14. This is because the air bubbles are guided to the outflow-side flow channel portion 60 which is disposed above the surface close to the downstream side oscillator 12. Therefore, the occurrence of a malfunction that the flow rate is erroneously detected by the ultrasonic flow metering portion 10 due to the accumulation of air bubbles on the surface close to the downstream side oscillator 12 can be prevented.

The pressure sensor 70 measures the pressure (supply pressure) of the fluid flowing into the inflow-side inclined flow channel 51 at the upstream side of the measurement flow channel 14 from the inflow port 100a. The pressure sensor 70 is, for example, a strain gauge pressure sensor. The pressure sensor 70 is attached to the inflow-side flow channel portion 50 by a sensor holder 71. A pressure signal indicating the pressure of the fluid measured by the pressure sensor 70 is transmitted to the control portion 30 and stored in a storage portion (not shown) included in the control portion 30. The pressure signal is transmitted to the external device via the cable 200.

As shown in FIG. 2, the shield member 80 is a member which is made of metal (such as stainless steel) and disposed to surround the upstream side oscillator 11 and the downstream side oscillator 12. The shield member 80 prevents the occurrence of an error in the measurement by the ultrasonic flow metering portion 10 due to external magnetism or the like.

The operation and effects of the flow rate adjusting device 100 of this embodiment described above will be described.

According to the flow rate adjusting device 100 of this embodiment, the direction along the axis line X1 on which the valve body portion 21 advances or recedes, the direction along the axis line X2 on which the straight tube-shaped measurement flow channel 14 is disposed, and the direction along the axis line X3 on which the control boards 31 and 32 are disposed are each parallel to the installation surface S. Therefore, the lengths which are required by the ultrasonic flow metering portion 10, the flow rate adjusting portion 20, and the control portion 30, respectively, in the installation direction (axis line Y direction) orthogonal to the installation surface S (i.e., the heights of the ultrasonic flow metering portion 10, the flow rate adjusting portion 20, and the control portion 30 when the installation surface S is a horizontal surface) can be shortened.

According to the flow rate adjusting device 100 of this embodiment, since the flow rate adjusting portion 20 is disposed between the ultrasonic flow metering portion 10 and the control portion 30 in the installation direction (axis line Y direction) orthogonal to the installation surface S, the installation area can be reduced in comparison with a case where the flow rate adjusting portion 20, the ultrasonic flow metering portion 10, and the control portion 30 are disposed at the same position in the installation direction (axis line Y direction). This is because when the ultrasonic flow metering portion 10, the flow rate adjusting portion 20, and the control portion 30 are stacked in the installation direction (axis line Y direction), the installation positions of these components overlap each other on the installation surface S.

Thus, the flow rate adjusting device 100 of this embodiment can reduce the installation area of the entire device, while enabling a flow rate measurement by the ultrasonic flow metering portion 10 including the straight tube-shaped measurement flow channel 14 and adjustment of the flow rate on the basis of the measurement result.

In the flow rate adjusting device 100 of this embodiment, the ultrasonic flow metering portion 10 is disposed at a position closer to the installation surface S in the installation direction than the control portion 30 and the flow rate adjusting portion 20.

With this structure, the ultrasonic flow metering portion 10 is disposed at a position close to the installation surface S and thus is less likely to be affected by vibrations or the like due to the operation of the flow rate adjusting portion 20. Therefore, the occurrence of an error in the measurement of the flow rate by the ultrasonic flow metering portion 10 can be reduced.

According to the flow rate adjusting device 100 of this embodiment, due to the presence of the inflow-side inclined flow channel 51, the inflow port 100a is located at a position farther from the installation surface S than the measurement flow channel 14 in the installation direction (axis line Y direction), and due to the presence of the outflow-side inclined flow channel 61, the outflow port 100b is located at a position closer to the installation surface S than the flow rate adjusting portion 20 in the installation direction. Thus, the inflow port 100a and the outflow port 100b can be located close to each other in the installation direction (axis line Y direction) and pipes connected to the inflow port 100a and the outflow port 100b can be set at an equal distance from the installation surface S. Consequently, the workability for attachment of pipes to the inflow port 100a and the outflow port 100b is improved.

In the flow rate adjusting device 100 of this embodiment, the housing portion 40 includes the partition member 43 which partitions the inside of the housing portion 40 into the first space SP1 in which the ultrasonic flow metering portion 10 and the flow rate adjusting portion 20 are disposed, and the second space SP2 in which the control portion 30 is disposed.

With this structure, even when a high-temperature fluid (for example, a liquid having a temperature in a range of 50° C. to 80° C.) is circulated, the partition member 43 prevents the temperature of the first space SP1 from being transmitted to the second space SP2. Therefore, a malfunction in the control portion 30 due to a temperature rise, and an adverse effect on lifetime due to a temperature rise can be prevented.

The flow rate adjusting device 100 of this embodiment includes the pressure sensor 70 which measures the pressure of the fluid flowing into the upstream side of the measurement flow channel 14 from the inflow port 100a.

With this structure, the pressure (supply pressure) of the fluid flowing in from the inflow port 100a can be appropriately detected and the supply pressure of the fluid can be stored in such a manner that, for example, a state in which the flow rate is adjusted by the flow rate adjusting portion 20 is associated with the supply pressure of the fluid at the time. Further, an optimum flow rate adjustment can be performed according to the pressure of the fluid by, for example, adjusting the movement of the valve body portion 21 of the flow rate adjusting portion 20 according to the fluid pressure measured by the pressure sensor 70.

The flow rate adjusting device 100 of this embodiment includes the shield member 80 which is made of metal and disposed to surround the upstream side oscillator 11 and the downstream side oscillator 12.

With this structure, since the upstream side oscillator 11 and the downstream side oscillator 12 are surrounded by the shield member 80 made of metal, the occurrence of an error in the measurement by the ultrasonic flow metering portion due to external magnetism or the like can be prevented.

The invention claimed is:

1. A flow rate adjusting device comprising:
an ultrasonic flow metering portion configured to measure a propagation time difference between ultrasonic waves transmitted by a pair of oscillators disposed at an upstream side and a downstream side of a straight tube-shaped measurement flow channel to obtain a flow rate of a fluid, the fluid flowing from an inflow port and being circulated through the measurement flow channel;
a flow rate adjusting portion configured to adjust the flow rate of the fluid flowing out to an outflow port from the downstream side of the measurement flow channel;
a control portion configured to control the flow rate adjusting portion on the basis of the flow rate of the fluid measured by the ultrasonic flow metering portion, the control portion including at least one control board;
an inflow-side flow channel portion configured to guide the fluid flowing in from the inflow port to the upstream side of the measurement flow channel; and
an outflow-side flow channel portion configured to guide the fluid to the outflow port, the fluid flowing out from the downstream side of the measurement flow channel, wherein
the flow rate adjusting portion includes a valve body portion and a drive portion configured to cause the valve body portion to advance or recede along a first axis line,
the measurement flow channel is disposed along a second axis line parallel to the first axis line,
the control board is disposed along a third axis line parallel to each of the first axis line and the second axis line, and the flow rate adjusting portion is disposed between the ultrasonic flow metering portion and the control portion in an installation direction orthogonal to an installation surface, the inflow-side flow channel portion includes an inflow-side inclined flow channel inclined in a direction approaching the installation surface from the inflow port to the upstream side of the measurement flow channel, and the outflow-side flow channel portion includes an outflow-side inclined flow channel inclined in a direction approaching the installation surface from the flow rate adjusting portion to the outflow port.

2. The flow rate adjusting device according to claim 1, wherein the ultrasonic flow metering portion is disposed at a position closer to the installation surface in the installation direction than the control portion and the flow rate adjusting portion.

3. The flow rate adjusting device according to claim 2, further comprising:
- an inflow-side flow channel portion configured to guide the fluid flowing in from the inflow port to the upstream side of the measurement flow channel; and
- an outflow-side flow channel portion configured to guide the fluid to the outflow port, the fluid flowing out from the downstream side of the measurement flow channel, wherein the inflow-side flow channel portion includes an inflow-side inclined flow channel inclined in a direction approaching the installation surface from the inflow port to the upstream side of the measurement flow channel, and the outflow-side flow channel portion includes an outflow-side inclined flow channel inclined in a direction approaching the installation surface from the flow rate adjusting portion to the outflow port.

4. The flow rate adjusting device according to claim 1, further comprising a housing portion configured to accommodate the ultrasonic flow metering portion, the flow rate adjusting portion, and the control portion, wherein the housing portion includes a partition member configured to partition an inside of the housing portion into a first space and a second space, the ultrasonic flow metering portion and the flow rate adjusting portion being disposed in the first space, the control portion being disposed in the second space.

5. The flow rate adjusting device according to claim 1, further comprising a pressure measuring portion configured to measure a pressure of a fluid flowing into the upstream of the measurement flow channel from the inflow port.

6. The flow rate adjusting device according to claim 1, further comprising a shield member made of metal, the shield member being disposed to surround the pair of oscillators.

* * * * *